United States Patent
Lesesky et al.

[11] Patent Number: 6,150,793
[45] Date of Patent: Nov. 21, 2000

[54] SYSTEM AND METHOD FOR MANAGING THE ELECTRICAL SYSTEM OF A VEHICLE

[75] Inventors: Alan C. Lesesky, Charlotte, N.C.; Bruce A. Purkey, Rogers, Ark.; Bobby Ray Weant, Rock Hill, S.C.

[73] Assignee: Vehicle Enhancement Systems, Inc., Rockhill, S.C.

[21] Appl. No.: 09/138,865

[22] Filed: Aug. 24, 1998

Related U.S. Application Data

[63] Continuation-in-part of application No. 08/608,814, Feb. 29, 1996, Pat. No. 5,798,577.

[51] Int. Cl.[7] ....................................................... H02J 7/00
[52] U.S. Cl. ............................................ 320/104; 320/103
[58] Field of Search ................................. 320/104, 103, 320/128

[56] References Cited

U.S. PATENT DOCUMENTS

| | | | |
|---|---|---|---|
| 5,038,728 | 8/1991 | Yoshida et al. | 123/198 R |
| 5,347,966 | 9/1994 | Mahon et al. | 123/179.21 |
| 5,721,688 | 2/1998 | Bramwell | 320/128 |
| 5,898,282 | 4/1999 | Drozdz et al. | 318/139 |

*Primary Examiner*—Peter S. Wong
*Assistant Examiner*—Lawrence Luk
*Attorney, Agent, or Firm*—Alston & Bird LLP

[57] ABSTRACT

Vehicle electrical system management systems and methods are provided for a vehicle, such as a tractor/trailer. In particular, a system and method are provided for detecting a faulty alternator or other motorized component by analyzing the waveform of the alternator and other motor of the vehicle. As a result, the system and method can provide a motorist with an advance warning as whether the alternator or other motor is functioning improperly. In addition, a system and method are provided for controlling the charging of a battery based upon the temperature of the battery such that the battery can be charged in a more efficient manner. In this regard, the temperature of the battery is sensed and the alternator thereafter charges the battery to a predefined voltage based upon the sensed temperature and a predetermined battery temperature/battery voltage schedule.

15 Claims, 8 Drawing Sheets

SYSTEM AND METHOD FOR MANAGING THE ELECTRICAL SYSTEM OF A VEHICLE

Related Application

This is a continuation-in-part of U.S. application Ser. No. 08/608,814 filed Feb. 29, 1996, now U.S. Pat. No. 5,798,577, the contents of which are incorporated herein.

FIELD OF THE INVENTION

This invention relates to electrical systems in vehicles, in particular, to systems and methods for managing the electrical system of a vehicle.

BACKGROUND OF THE INVENTION

The trucking industry has for many years used tractor/trailer combinations to transport cargo over the roadways to intended destinations. As shown in FIG. 1, a tractor 10 and a trailer 20 are mechanically coupled together so that the tractor can pull the trailer with its cargo in an efficient and cost-effective manner using mechanical energy provided by a tractor engine 15 located on the tractor 10. A tractor/trailer combination typically also includes numerous electrical subsystems 50 located on the tractor or the trailer which utilize electrical energy provided by a battery 32. The construction of the battery 32 is well-known, conventionally including a plurality of serially-connected rechargeable lead-acid secondary cells (not shown), each including plate-like electrodes (not shown) immersed in an acidic electrolyte solution (not shown). The battery 32 typically is charged by an alternator 34 mechanically driven by the tractor engine 15. A regulator 36 electrically connected to the alternator 34 controls the electric charge provided by the alternator 34 to the battery 32 in a manner known to those skilled in the art.

The electrical subsystems 50 of a vehicle include a cranking system, which is used to start the tractor engine 15. In addition to the battery 32, the cranking system includes a starter which conventionally has a starter motor, an output shaft, a pinion gear connected to the output shaft, a ring gear connected to the engine flywheel, and a starter solenoid, a magnetically-operated actuator which causes the pinion gear to engage the ring gear when the starter solenoid is energized. When engaged and energized, the starter motor turns the pinion gear transferring mechanical energy to the flywheel and turning the engine 15. The starter motor conventionally is engaged and energized through a relay which closes a high current capacity starter circuit running from the battery to the starter motor and the starter solenoid. The relay conventionally is actuated by a switched circuit connected to the battery 32 through a manually operated ignition switch. The ignition switch conventionally includes momentary pushbutton or similar switch.

In addition to the cranking system, electrical subsystems 50 of tractor/trailers increasingly include a number of electrical accessories such as communication systems, audio systems, video systems, microwave ovens, refrigerators, electric heaters, and the like. Other such subsystems may include motors such as a starter, windshield wipers, heater blower, air conditioning systems, etc. Other non-motor electrical components include electronic black boxes, flashers, relays, coils and contacts. Further, the trailer may include electrical components, such as an anti-lock braking system, refrigeration unit, or other components that receive power from the electrical system of the tractor and, more particularly, from the battery 32.

As most motorists and truckers are aware, the electrical components of a vehicle fail from time to time. Notwithstanding the relatively complex electronics onboard modern vehicles, there is still no common diagnostic circuitry for informing a motorist that a specific one of the plurality of electrical components is faulty or is otherwise failing. As a result, the troubleshooting and repair process is oftentimes time-consuming and laborious. More specifically, there is no common diagnostic circuitry for providing advance notice of potential faults in specific ones of the electrical components, which often leads to stranded motorists in need of roadside repairs. For example, modern vehicles generally do not include any means for identifying the impending failure of the alternator which can lead to an improperly charged battery and, in turn, to a vehicle that will not crank.

Since many electrical systems depend on electrical energy supplied by a battery, it is vital that the battery be properly charged. In this regard, the amount of charge that the battery will take is related to the applied charging voltage and the temperature of the battery. For example, a battery should be charged at a lower voltage when hot and at a higher voltage when cold. Unfortunately, alternators commonly used in tractor/trailers and other vehicles do not regulate the battery charging function based upon the temperature at the battery. Thus, batteries in vehicles do not receive optimal charging, thereby decreasing the efficiency of the charging process and potentially adversely affecting the performance of the electrical components of the vehicle that are dependent on the battery.

OBJECTS AND SUMMARY OF THE INVENTION

In the light of the foregoing, it is another object of the invention to provide systems and methods for analyzing the alternators and motors of a vehicle to detect faults in such components.

It is yet another object of the invention to provide systems and methods for optimizing the charge of the battery in a vehicle.

These objects, advantages and features of the invention are provided by systems and methods for managing the electrical systems of a vehicle, such as a tractor/trailer. According to one embodiment, a system and method are provided for detecting a faulty alternator or other motorized component by analyzing the waveform of the alternator and other motor of the vehicle. As a result, the system and method of this embodiment can provide a motorist with an advance warning as whether the alternator or other motor is functioning improperly. According to another embodiment, a system and method are provided for controlling the charging of a battery based upon the temperature of the battery such that the battery can be charged in a more efficient manner.

According to either embodiment, a vehicle is provided which comprises an engine for producing mechanical energy to propel the vehicle, engine cranking means which is operatively connected to the engine for cranking the engine, a battery mounted on the vehicle to supply electrical energy to the engine cranking means, and an alternator operatively connected to the battery to supply electrical energy to the battery in the form of a waveform. According to one embodiment, the vehicle also includes waveform analysis means for comparing the actual waveform supplied by the alternator to a predetermined waveform indicative of a properly functioning alternator. The waveform analysis means of this embodiment also provides an indication, such as a warning to the motorist, if the actual waveform varies from the predetermined waveform by more than a predetermined amount, thereby alerting the motorist that the alternator may be failing or otherwise malfunctioning prior to stranding the motorist along the shoulder of a road.

While the predetermined waveform can be predefined, the waveform analysis means can capture the waveform output by a properly functioning alternator, such as a newly installed alternator, in order to define the predetermined waveform. In any event, the waveform provided by the alternator typically has an RMS value. As such, the waveform analysis means can determine the RMS value of the actual waveform supplied by the alternator and can compare the RMS value of the actual waveform to the RMS value for the predetermined waveform indicative of a properly functioning alternator. This embodiment of the present invention also contemplates a method of detecting a faulty alternator in a vehicle, including the steps of supplying electrical energy from the alternator to a battery in the form of a waveform, comparing the actual waveform supplied by the alternator to a predetermined waveform indicative of a properly functioning alternator, and providing an indication, such as a warning to the motorist, if the actual waveform varies from the predetermined waveform by more than a predetermined amount. As with the vehicle itself, the waveform typically has an RMS value such that the comparison process can involve a comparison of the RMS value of the actual waveform supplied by the alternator with the RMS value of the predetermined waveform indicative of a properly functioning alternator.

The system and method of this embodiment of the present invention can therefore detect a faulty alternator or other electrical component prior to its actual failure. As such, the system and method of this embodiment can provide the motorist or trucker with an indication or warning of the potential impending failure such that corrective action can be taken prior to complete failure of the engine. Since the system and method of this embodiment identifies potential faults with particular ones of the electrical components, the indication or warning will also assist in the repair of the vehicle by expediting troubleshooting and other diagnostic procedures.

According to the other embodiment of the present invention directed to optimizing the alternator's charging of a battery, a vehicle is provided which not only includes an engine, engine cranking means, a battery and an alternator, but also includes temperature sensing means operatively connected to the battery for sensing the temperature of the battery, and control means, operatively connected to the temperature sensing means and the alternator, for controlling the electrical energy supplied by the alternator to the battery in response to a predetermined battery temperature/battery voltage schedule such that the battery is appropriately charged based upon the sensed temperature of the battery. In this regard, the vehicle may include a memory device for storing a plurality of different predetermined battery temperature/battery voltage schedules for respective ones of a plurality of different battery types. As such, the system and method of this embodiment can controllably charge the battery based upon the appropriate battery temperature/battery voltage schedule.

The vehicle of this embodiment can also include a regulator operatively connected to the alternator for controlling the supply of electrical energy from the alternator to the battery in response to the predetermined battery temperature/battery voltage schedule such that the battery is appropriately charged based upon the sensed temperature of the battery. Also, the vehicle may further include a battery heater operatively connected to the temperature sensing means and the battery for heating the battery when the temperature of the battery sensed by the temperature sensing means falls below a predetermined setting. As such, the battery can not only be appropriately charged, but can be controllably heated if the temperature becomes too cold.

According to a method aspect of this embodiment, a method of optimizing the charge of a battery by an alternator in a vehicle is provided comprising the steps of providing a predetermined battery temperature/battery voltage schedule, sensing the temperature of the battery, providing electrical energy from the alternator to the battery to recharge the battery, and controlling the electrical energy supplied by the alternator to the battery in response to the predetermined battery temperature/battery voltage schedule such that the battery is appropriately charged based upon the sensed temperature of the battery. Similar to the description of the vehicle of this embodiment, a plurality of different predetermined battery temperature/battery voltage schedules may be provided for respective ones of a plurality of different battery types such that the method of this embodiment must initially select the appropriate battery temperature/battery voltage schedule. Further, the method aspect of the invention may also comprise the step of regulating the alternator for controlling the supply of electrical energy from the alternator to the battery in response to the predetermined battery temperature/battery voltage schedule such that the battery is appropriately charged based upon the sensed temperature of the battery. Further, when the temperature of the battery falls below a predetermined setting, the method may comprise the additional step of heating the battery.

Thus, the system and method of this embodiment of the invention permits the battery to be charged to different predetermined voltage levels depending upon the temperature. As such, an alternator can recharge a battery according to this embodiment of the invention in the most efficient manner and in a manner which does not harm or otherwise damage the battery, thereby contributing to the long life of the battery.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF THE PREFERRED EMBODIMENTS

The present invention now will be described more fully hereinafter with reference to the accompanying drawings in which preferred embodiments of the invention are shown. This invention may, however, be embodied in many different forms and should not be construed as limited to the illustrated embodiments set forth herein; rather, these embodiments are provided so that this disclosure will be thorough and complete and will fully convey the scope of the invention to those skilled in the art. Like numbers refer to like elements throughout.

Figure 1:
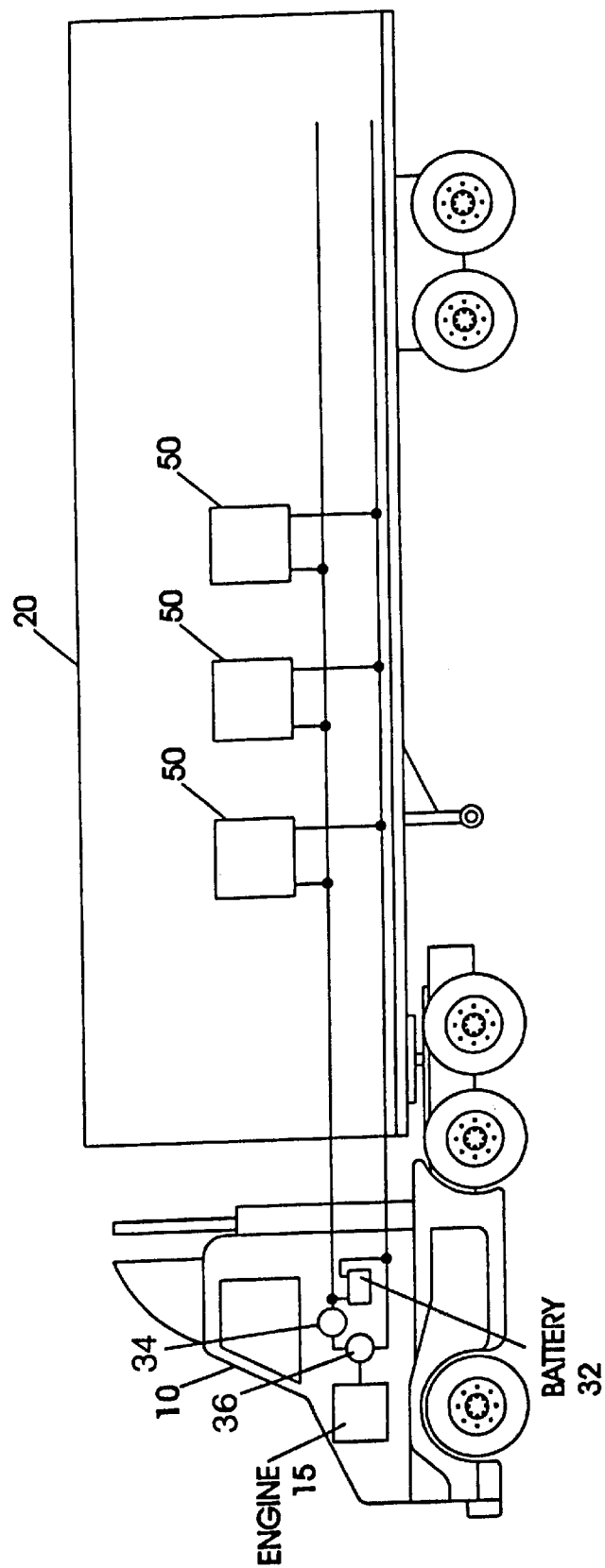
FIG. 1 is a schematic diagram illustrating a tractor/trailer vehicle according to the prior art.

The systems and methods of the present invention facilitate the management of the electrical system of a vehicle. These systems and methods include a battery optimization system and method for selectively charging the battery based upon the temperature of the battery as well as a diagnostic system and method for detecting a faulty alternator or the like based upon waveform analysis techniques. Although the systems and methods of the present invention are particularly useful for managing the various electrical subsystems of a tractor/trailer as shown in FIG. 1, the systems and methods of the present invention can also be used in conjunction with other types of vehicles, if so desired.

Figure 2:
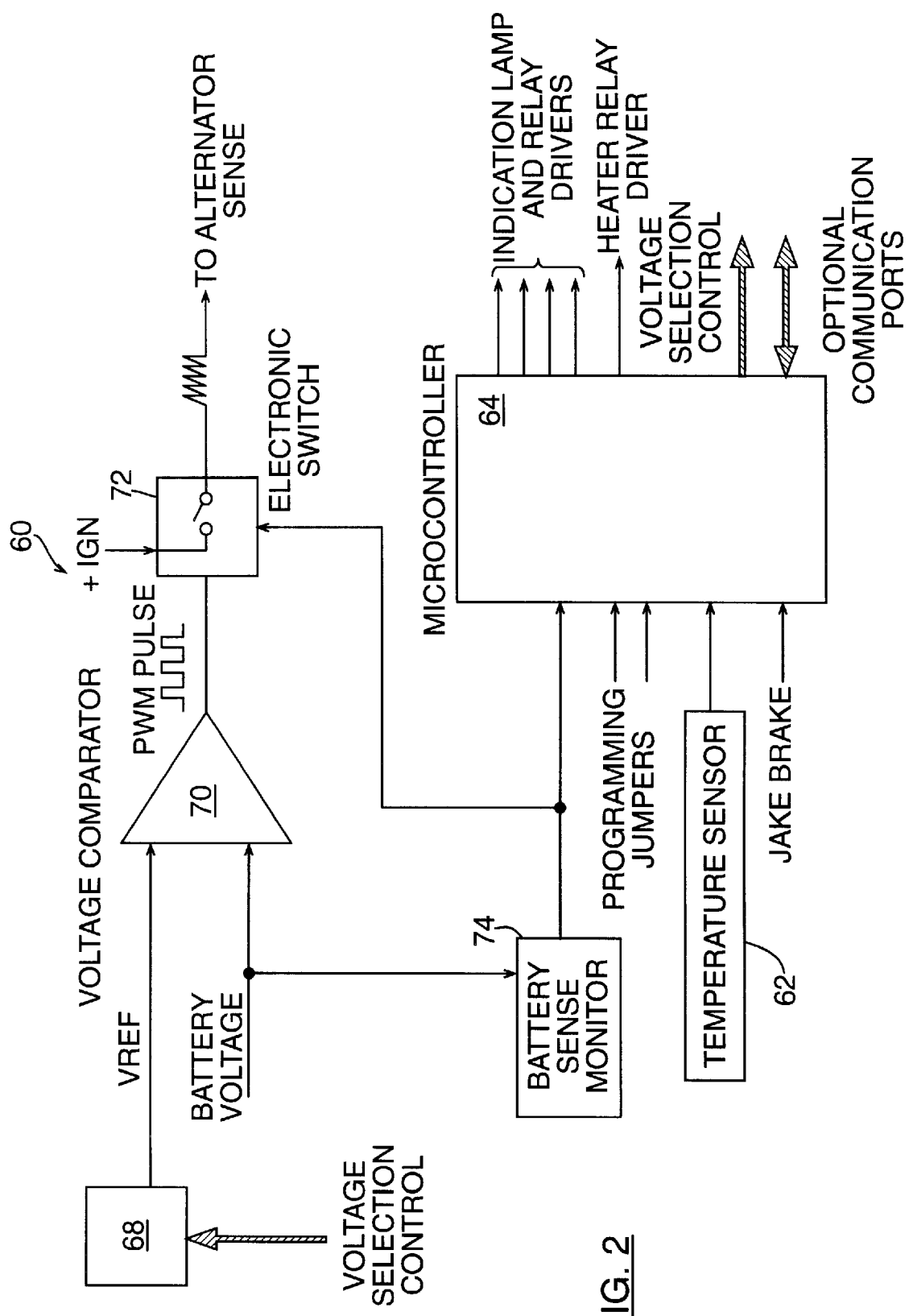
FIG. 2 is a schematic diagram illustrating a battery optimization system of one embodiment of the invention.

FIG. 2 is a schematic diagram illustrating a battery optimization system 60 of one embodiment of the invention. The battery optimization system includes temperature sensing means, such as a temperature sensor 62, which senses the temperature of the battery 32. The temperature sensor can be internal to the battery or can be mounted external to the battery. In either instance, the temperature sensor provides a signal indicative of the temperature of the battery. The battery optimization sensor also includes control means, such as a microcontroller 64 which may be embodied by a microprocessor or the like, for receiving the temperature signal from the battery. Although the temperature signal can be transmitted via a hardwire connection between the temperature sensor and the microcontroller, both the temperature sensor and the microcontroller can be connected to a communications bus, such as industry standard SAE J1708 and SAE J1939 communications buses, such that the temperature signal can be transmitted via the communications bus.

According to the present invention, the battery optimization system 60 includes a memory device for storing a predetermined battery temperature/battery voltage schedule. Although the battery optimization system can include a discrete memory device, the microcontroller 64 of the embodiment of FIG. 2 includes the memory device. As shown in Table 1 below, the battery temperature/battery voltage schedule specifies the desired voltage level to which the battery is charged for a specific temperature. Typically, different types of batteries have different battery temperature/battery voltage schedules. As such, the memory device can store a plurality of battery temperature/battery voltage schedules as also reflected in Table 1 below which includes exemplary schedules for a low maintenance battery and a maintenance battery.

TABLE 1

| Temperature (° F.) | Low Maintenance Battery (Volts) | Maintenance Free Battery (Volts) |
|---|---|---|
| Below 0 | 14.6 | 15.0 |
| 0–20 | 14.4 | 14.8 |
| 20–40 | 14.2 | 14.6 |
| 40–60 | 14.0 | 14.4 |
| 60–80 | 13.8 | 14.2 |
| 80–100 | 13.6 | 14.0 |
| 100–120 | 13.4 | 13.8 |
| 120+ | 13.25 | 13.4 |

Based upon the temperature signal and the predetermined battery temperature/battery voltage schedule, the microcontroller 64 provides a voltage selection control signal that is indicative of the voltage to which the battery 32 should be charged. As shown in FIG. 2, the battery optimization system 60 can include a programmable voltage reference source 68, which is preprogrammed to produce an output (designated $V_{ref}$) which can have a voltage level that equals any one of the voltages set forth by the battery temperature/battery voltage schedule. In operation, the voltage reference source is responsive to the voltage selection control signal so as to produce an output $V_{ref}$ having a voltage level that equals the voltage to which the battery should be charged according to the battery temperature/battery voltage schedule.

The battery optimization system also includes a voltage comparator 70 that compares the reference voltage $V_{ref}$ with the actual voltage level of the battery 32. The voltage comparator provides a signal that is pulse width modulated in different manners depending upon whether the actual voltage level of the battery equals or is less than the reference voltage $V_{ref}$. According to one advantageous embodiment, the pulse width modulated signal is imposed upon the sense wire of the regulator 36 which is, in turn, connected to the alternator 34. As such, the alternator will provide electrical energy to the battery if the pulse width modulated signal indicates that the battery has not been recharged to the reference voltage level, but will cease further recharging if the pulse width modulated signal indicates that the battery has been recharged to the reference voltage level. As the temperature fluctuates, the battery can therefore be controllably recharged to different voltage levels depending upon the predetermined battery temperature/battery voltage schedule.

As shown in FIG. 2, the battery optimization system 60 can also include an electronic switch 72 which permits the pulse width modulated signal to be provided by the voltage comparator 70 to the alternator 34 in instances in which the vehicle ignition is on (+IGN) and the battery sense wire remains connected. In this regard, the battery optimization system includes a battery sense monitor 74 which monitors the battery voltage and provides a signal to the microcontroller 64 and to the electronic switch if the battery sense wire becomes disconnected. Since the electronic switch is opened in instances in which the battery sense wire is disconnected, the alternator is prevented from attempting to further charge the battery 32.

Although the battery 32 is preferably charged according to the respective battery temperature/battery voltage schedule, the microcontroller 64 can specify that the battery is to be charged to a different voltage other than that specified by the schedule for the sensed temperature. For example, the microcontroller may specify by means of the voltage selection control signal that the battery is to be charged to a different voltage due to a change in the electrical load or the application of the jake (J) brake. For instance, when the jake (j) brake is released, the microcontroller may specify by means of the voltage selection control signal that the battery is to be charged at a higher voltage so that the anti-lock braking system (ABS) remains operational at all times.

The battery optimization system 60 can also include a battery heater for warming an otherwise cold battery. As such, the microcontroller 64 can be programmed to provide a signal to the heater relay driver which actuates the battery heater if the sensed battery temperature when the vehicle is running falls below a predetermined temperature, such as 32° F.

The battery optimization system 60 also includes one or more indicators, such as light emitting diodes (LEDs), which can be driven by the microcontroller 64 to indicate the battery type, to indicate that the battery voltages and the battery temperature are at normal values, above normal values or below normal values, to indicate whether the battery heater is activated, etc. In addition, if the battery sense monitor 74 indicates that the battery sense wire has become disconnected, the microcontroller will drive the LEDs such that all LEDs will flash together and the heater relay driver is deactivated. The microcontroller also has inputs for receiving programming jumpers which permits an operator or technician to cycle the battery optimization system through each of the reference voltages $V_{ref}$ irrespective of the battery temperature or the battery type. The programming jumpers will also permit an operator or technician to selectively activate and test each of the LEDs.

Figure 3:
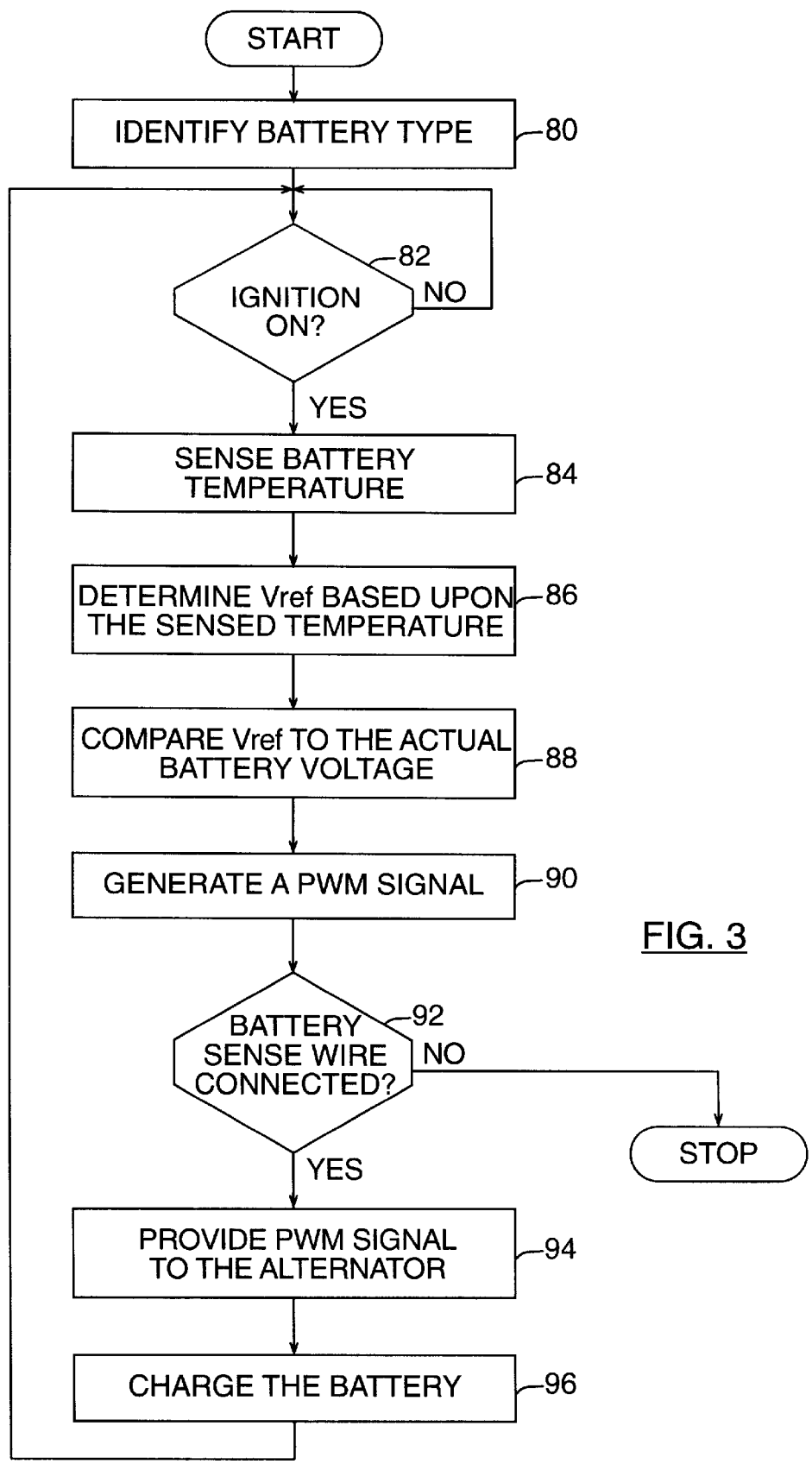
FIG. 3 is a flowchart illustrating operations performed by the system and method of optimizing the charge of a battery in a vehicle according to one embodiment of the invention.

FIG. 3 is a flowchart illustrating operations performed by the system and method for optimizing the charge of a battery 32 in a vehicle according to one embodiment of the invention. As described above, the battery type is initially identified at block 80 which, in turn, defines the predetermined battery temperature/battery voltage schedule. Once the vehicle ignition is on, the battery temperature is sensed. See blocks 82 and 84. A reference voltage $V_{ref}$ defined by the sensed temperature and by the predetermined battery temperature/battery voltage schedule is then compared to the actual battery voltage and a pulse width modulated signal is generated based upon the comparison. See blocks 86–90. So long as the battery sense wire remains connected, the pulse width modulated signal is provided to the alternator which, in turn, charges the battery. See blocks 92–96. This intelligent recharging process thereafter continues until the ignition of the vehicle is turned off.

Figure 4A:
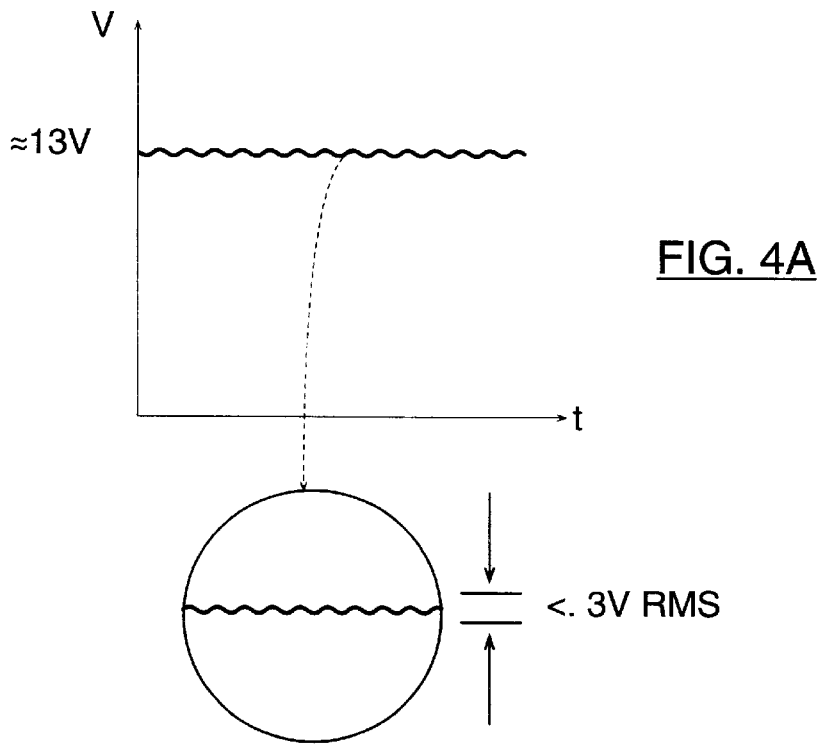
FIGS. 4A and 4B are a schematic diagram illustrating the waveforms produced by properly functioning and faulty alternators, respectively.
Figure 4B:
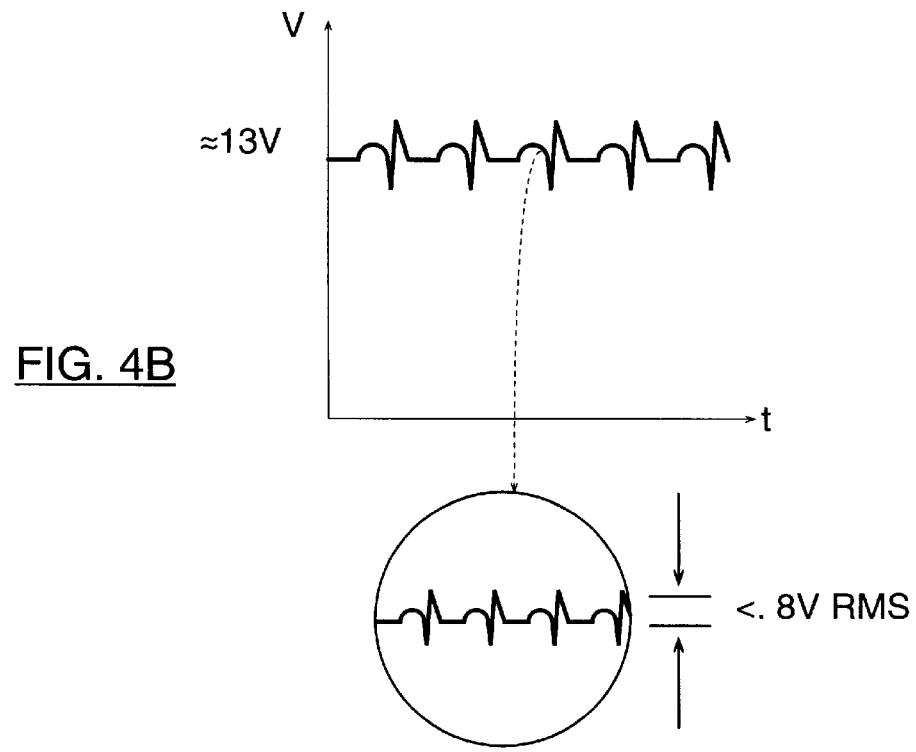

The alternator 34 is operatively connected to the battery 32 to supply electrical energy to the battery in order to recharge the battery. The waveform of the voltage supplied to the battery by a properly functioning alternator generally has relatively little ripple while the voltage supplied by a faulty alternator generally has a much greater ripple as shown in FIGS. 4A and 4B, respectively. For example, the root mean square (RMS) of the ripple of a properly functioning alternator is generally less than 0.3 volts, while the ripple of a faulty alternator is generally greater than 0.8 volts. The system and method of this embodiment of the invention therefore detects if the alternator is in properly functioning or faulty and provides an appropriate indication to the driver such that the vehicle can hopefully be repaired without stranding the driver at the roadside.

Figure 5:
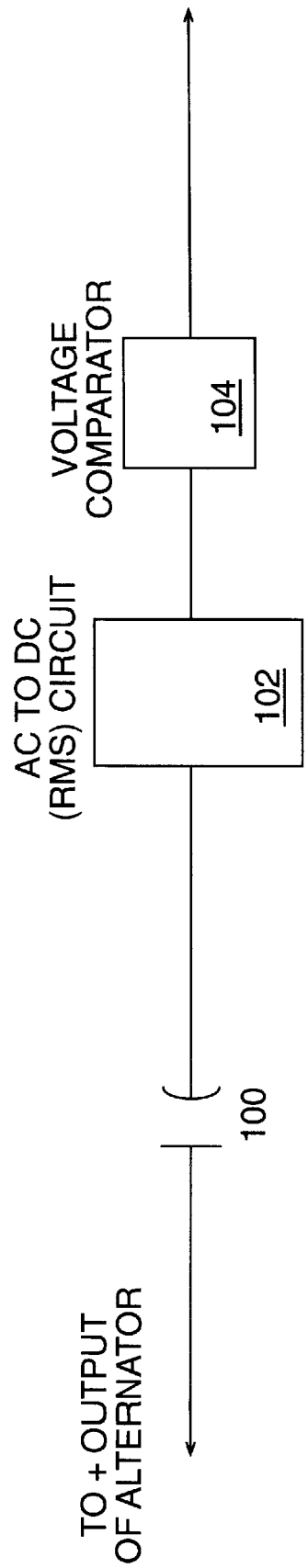
FIG. 5 is a schematic diagram illustrating a circuit for detecting a faulty alternator according to one embodiment of the invention.

FIG. 5 is a schematic diagram illustrating a waveform analysis means for detecting a faulty alternator 34 according to one embodiment of the invention by comparing the actual waveform supplied by an alternator to a predetermined waveform indicative of a properly functioning alternator. The waveform analysis means illustrated in FIG. 5 is operatively connected to the output of the alternator by means of an isolation capacitor 100 that is designed to pass only the AC portion of the alternator output. The AC portion of the alternator output is then fed into an AC to DC (RMS) circuit 102 which determines the RMS value of the AC portion of the alternator output. A voltage comparator 104 then compares the RMS value to a predetermined value indicative of a properly functioning alternator. With respect to the example depicted in FIGS. 4A and 4B, the predetermined value may be set to 0.5 volts such that RMS values less than 0.5 volts indicate that the alternator is properly functioning, while RMS values greater than 0.5 volts indicate that the alternator is faulty. As such, the binary (on/off) output of the voltage comparator will indicate whether the alternator is properly functioning (RMS value being less than the predetermined value) or whether the alternator is faulty (RMS value is greater than the predetermined value). The binary output of the voltage comparator can drive an LED or indicator to provide an indication if the alternator is properly functioning or is faulty. If faulty, the driver may be able to replace the alternator prior to discovering that the vehicle will no longer start as a result of an improperly charged battery.

Figure 6:
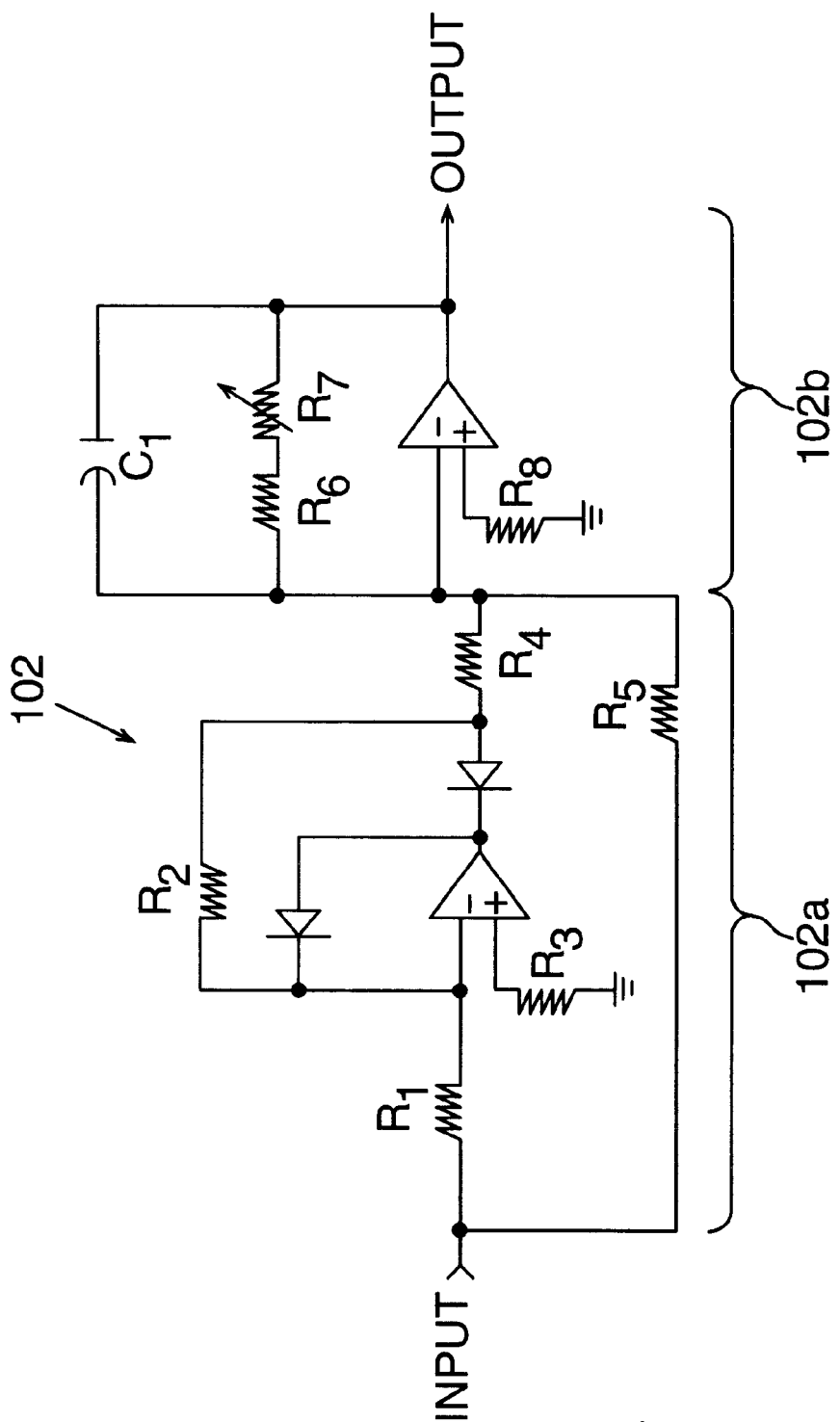
FIG. 6 is a schematic diagram illustrating one embodiment of the AC to DC (RMS) circuit of FIG. 5.

FIG. 6 is a schematic diagram illustrating one embodiment of the AC to DC (RMS) circuit 102 of FIG. 5. The input to the circuit represents the AC portion of the output signal from the alternator 34. The first portion 102a of the circuit serves as a signal rectifier, while the second portion 102b serves as both a low pass filter and an absolute value circuit such that the absolute value of the RMS value of the AC signal that is output. While the circuit components can be selected as desired by the circuit designer, the AC to DC (RMS) circuit of one embodiment is designed such that $R_1$, $R_2$, $R_5$ and $R_6$ are 10 KΩ; $R_3$ and $R_4$ are 5 KΩ; $R_7$ is a 1 KΩ potentiometer, $R_8$ is 2.4 KΩ, $C_1$ is 10 μF, the diodes are IN914 diodes and the op amps are LM747 op amps.

While the waveform analysis means of FIG. 5 compares the RMS value of the alternator output to a predetermined RMS value indicative of a properly functioning alternator 34, the waveform analysis means can utilize other techniques to compare the actual waveform supplied by the alternator to a predetermined waveform indicative of a properly functioning alternator. For example, the waveform analysis means can include means, such as an electrical circuit, for capturing the waveform output by a properly functioning alternator in order to define the predetermined waveform.

Figure 7:
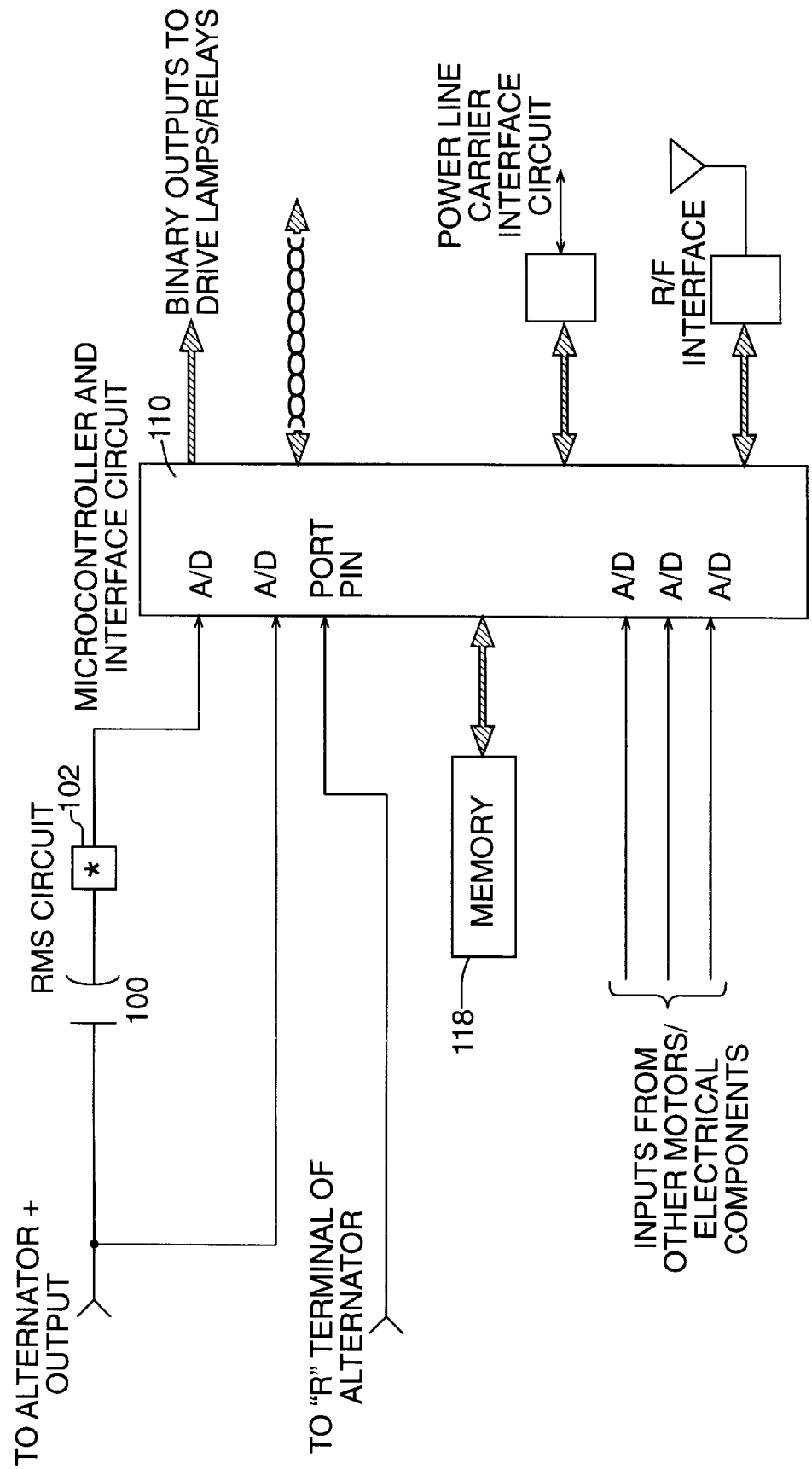
FIG. 7 is a schematic diagram illustrating a system for detecting a faulty alternator and/or other electrical components according to one embodiment of the invention.

FIG. 7 is a schematic diagram illustrating a system for detecting a faulty alternator according to one embodiment of the invention. While the system and method of the present invention have been described heretofore in conjunction with the detection of a faulty alternator, the system and method can also detect other faulty electrical motors and components as depicted in FIG. 7. These other motors include the starter motor, the windshield motor, the heater blower motor, etc., while the other electrical components include electronic black boxes, flashers, relays, coils and contacts.

The system of FIG. 7 includes a microcontroller and interface circuit 110, such as a microprocessor, for receiving the output of the AC to DC (RMS) circuit 102 of FIG. 5. Based upon the binary output of the AC to DC (RMS) circuit, the microcontroller determines if the alternator is properly functioning or is faulty and provides an indication if the alternator is found to be faulty. For example, the microcontroller can provide a visual indication by lighting one or more LEDs which signal to the driver or a technician that the alternator is likely faulty. In addition, the microcontroller can provide a digital signal via a communications bus, such as the industry standard SAE J1939 or SAE J1708 buses, that indicates that the alternator is likely faulty. The microcontroller can also transmit a signal off-board, i.e., external to the vehicle, that the alternator is faulty. For example, the microcontroller can transmit an RF signal to advise a central office or a dispatcher that the alternator on the vehicle is likely faulty.

The system and method of the present invention is designed not to register a fault in instances in which alternator 34 is not providing an output. Since the "R" terminal of an alternator only generates a series of pulses when the alternator is providing an output, the microcontroller and interface circuit 110 preferably also monitors the "R" terminal of the alternator. If the microcontroller detects, via the "R" terminal, that the alternator is not generating an output, the microcontroller will likewise not generate a signal indicating that the alternator is faulty.

As mentioned above, the micro-controller and interface circuit can also receive inputs from other motors or electrical components of the vehicle. As described above in conjunction with an alternator 34, the inputs from the other motors or electrical components are preferably conditioned, such as by an AC to DC (RMS) circuit 102, so as to provide a binary indication of the status of the respective motor or electrical component which can then be analyzed by the microcontroller in order to detect whether these other motors and electrical components are properly functioning or are faulty. In addition to the motors and electrical components onboard a vehicle, the system and method of this embodiment can also be mounted upon a tractor/trailer and can be adapted to monitor motors or other electrical components resident on the trailer, such as the antilock brake system and/or the refrigeration system. As described by copending U.S. patent application Ser. No. 08/976,391, the contents of which are incorporated herein, signals indicative of the output of the motors or other electrical components resident on a trailer can be transmitted via power line communications to the communications bus within the tractor and, in turn, to the microcontroller. The system can also include a memory device 118 for storing data relating to each of the motors and other electrical components to be analyzed such that the signals provided by the motors and other electrical components can be properly analyzed by the microcontroller.

Figure 8:
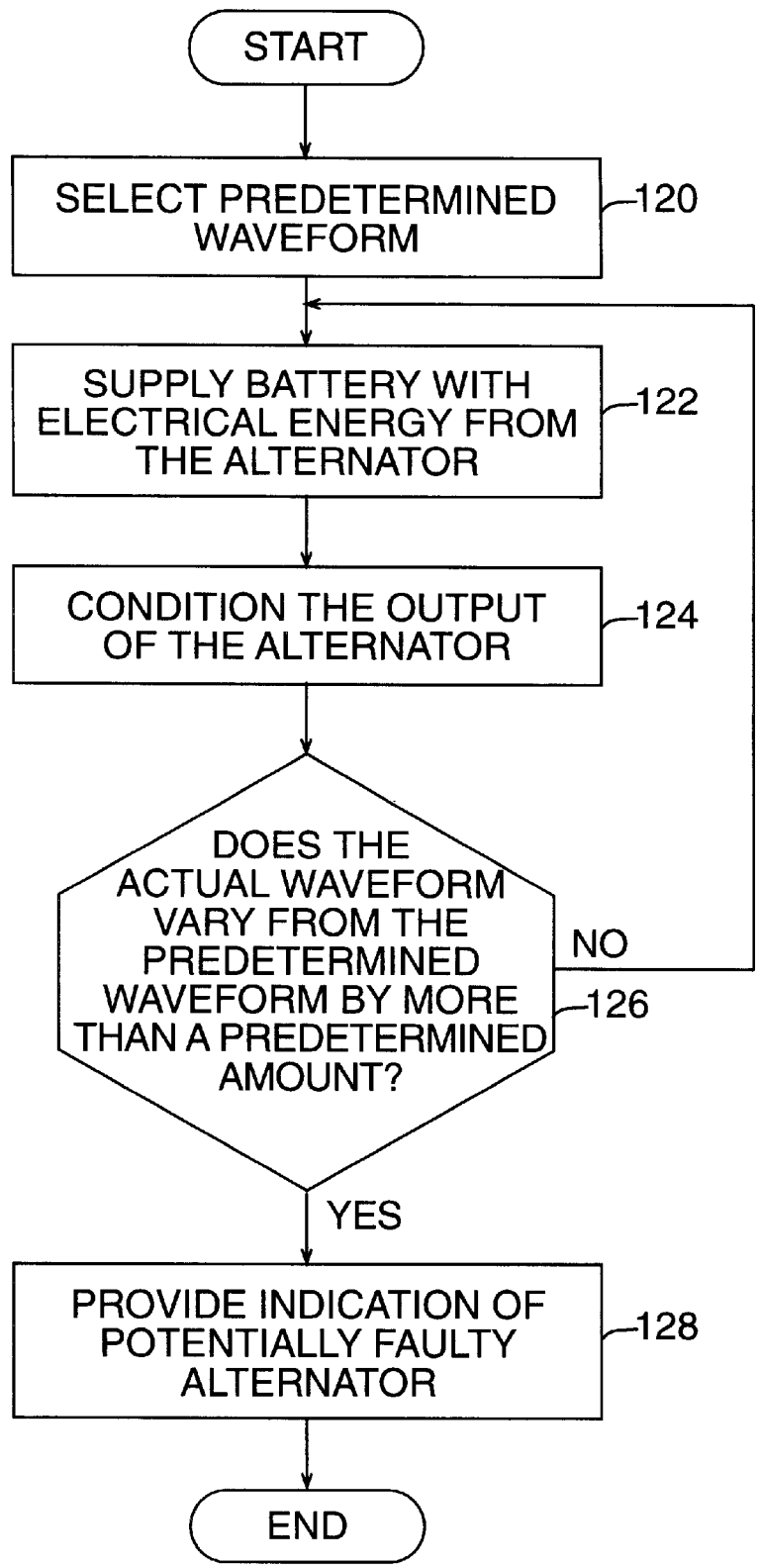
FIG. 8 is a flowchart illustrating operations performed by the system and method for detecting faulty electrical components of a vehicle, such as a faulty alternator.

FIG. 8 is a flowchart illustrating operations performed by the system and method for detecting faulty electrical components of a vehicle, such as a faulty alternator, according to one embodiment of the present invention. The predetermined waveform indicative of a properly functioning alternator or other motor/component that is being evaluated is first selected, such as by a technician, at block 120. Once the vehicle is running, electrical energy from the alternator 34 is supplied to the battery 32 at block 122. Similarly, if another motor/component is being evaluated, that motor/component would also generate an electrical output signal. The output of the alternator or other motor/component is then conditioned, such as by an AC to DC (RMS) circuit 102 as described above and shown schematically in block 124. The system and method of this embodiment of the present invention then determines at block 126 whether the actual waveform varies from the predetermined waveform by more than a predetermined amount. If not, the system and method simply repeats the analysis process until the vehicle ignition is turned off. If the waveform has varied by more than the predetermined amount from the predetermined waveform, however, the system and method of this embodiment of the present invention will provide an indication as shown at block 128 to the driver or technician that the alternator or the other motor/component being evaluated is potentially faulty. As such, the faulty alternator or other component can hopefully be replaced prior to complete failure of the component.

In the drawings and specification, there has been disclosed preferred embodiments of the invention, and, although specific terms are employed, the terms are used in a descriptive sense only and not for purposes of limitation. The invention has been described in considerable detail with specific reference to various illustrated embodiments. It will be apparent, however, that various modifications and changes can be made within the spirit and scope of the invention as described in the foregoing specification and defined in the appended claims.

That which is claimed:

1. A vehicle comprising:

an engine for producing mechanical energy to propel said vehicle;

engine cranking means operatively connected to said engine for cranking said engine;

a battery mounted on said vehicle to supply electrical energy to said engine cranking means;

an alternator operatively connected to said battery to supply electrical energy to said battery;

temperature sensing means operatively connected to said battery for sensing the temperature of said battery; and control means, operatively connected to said temperature sensing means and said alternator, for controlling the electrical energy supplied by said alternator to said battery in response to a predetermined battery temperature/battery voltage schedule such that said battery is appropriately charged based upon the sensed temperature of said battery.

2. A vehicle according to claim 1 further comprising a memory device for storing a plurality of predetermined battery temperature/battery voltage schedules for respective ones of a plurality of different battery types.

3. A vehicle according to claim 1 further comprising a regulator operatively connected between said control means and said alternator for controlling the supply of electrical energy from said alternator to said battery in response to the predetermined battery temperature/battery voltage schedule such that said battery is appropriately charged based upon the sensed temperature of said battery.

4. A vehicle according to claim 1 further comprising a battery heater operatively connected to said temperature sensing means and said battery for heating said battery when the temperature of said battery sensed by said temperature sensing means falls below a predetermined setting.

5. A vehicle comprising:

an engine for producing mechanical energy to propel said vehicle;

engine cranking means operatively connected to said engine for cranking said engine;

a battery mounted on said vehicle to supply electrical energy to said engine cranking means;

an alternator operatively connected to said battery to supply electrical energy to said battery in the form of a waveform;

waveform analysis means for comparing the actual waveform supplied by said alternator to a predetermined waveform indicative of a properly functioning alternator and for providing an indication if the actual waveform varies from the predetermined waveform by more than a predetermined amount, wherein said waveform analysis means comprises means for determining an RMS value of the actual waveform supplied by said alternator and for comparing the RMS value of the actual waveform with an RMS value for the predetermined waveform indicative of a properly functioning alternator.

6. A vehicle according to claim 5 further comprising indicator means for warning the operator of said vehicle if the actual waveform representing the electrical energy supplied to said battery by said alternator varies from the predetermined waveform by more than the predetermined amount.

7. A vehicle according to claim 5 wherein said waveform analysis means comprises means for capturing the waveform output by a properly functioning alternator in order to define the predetermined waveform.

8. A method of optimizing the charge of a vehicle battery by an alternator comprising the steps of:

providing a predetermined battery temperature/battery voltage schedule;

sensing the temperature of said battery;

providing electrical energy from the alternator to the battery to thereby charge the battery; and controlling the electrical energy provided by said alternator to said battery in response to the predetermined battery temperature/battery voltage schedule such that said battery is appropriately charged based upon the sensed temperature of said battery.

9. A method according to claim 8 wherein said providing step comprises providing a plurality of different predetermined battery temperature/battery voltage schedules for respective ones of a plurality of different battery types.

10. A method according to claim 8 further comprising the step of regulating said alternator so as to control the supply of electrical energy from said alternator to said battery in response to the predetermined battery temperature/battery voltage schedule such that said battery is appropriately charged based upon the sensed temperature of said battery.

11. A method according to claim 8 further comprising the steps of:

sensing if the temperature of the battery falls below a predetermined setting; and heating said battery when the sensed temperature of said battery falls below the predetermined setting.

12. A method of detecting a faulty alternator in a vehicle, comprising the steps of:

supplying electrical energy from said alternator to a battery in said vehicle in the form of a waveform;

comparing the actual waveform supplied by said alternator to a predetermined waveform indicative of a properly functioning alternator;

providing an indication if the actual waveform varies from the predetermined waveform by more than a predetermined amount; and determining an RMS value of the actual waveform supplied by said alternator, and wherein said comparing step comprises comparing the RMS value of the actual waveform with an RMS value for the predetermined waveform indicative of a properly functioning alternator.

13. A method according to claim 12 wherein said of providing an indication comprises the step of warning the operator of said vehicle if the actual waveform representing the electrical energy supplied to said battery by said alternator varies from the predetermined waveform by more than the predetermined amount.

14. A method according to claim 12 further comprising the step of capturing the waveform output by a properly functioning alternator in order to define the predetermined waveform.

15. A method according to claim 12 wherein said supplying, comparing and providing steps are performed while the vehicle is in an operative state.

* * * * *